UNITED STATES PATENT OFFICE.

HENRY A. CLAASEN, OF BROOKLYN, NEW YORK.

PROCESS OF MAKING FIRE AND WATER PROOF FABRICS.

SPECIFICATION forming part of Letters Patent No. 496,599, dated May 2, 1893.

Application filed February 23, 1893. Serial No. 463,453. (No specimens.)

*To all whom it may concern:*

Be it known that I, HENRY A. CLAASEN, a citizen of the United States, residing in Brooklyn, in the county of Kings and State of New York, have invented certain new and useful Improvements in Processes of Making Fire and Water Proof Fabrics, of which the following is a specification.

This invention relates to an improved process of making water and fire proof fabrics, which I intend to be used for roof-coverings and similar purposes, and the invention consists in the following process: first, applying a suitable size, secondly, treating the fabric with a solution of boiled linseed-oil, infusorial earth and whiting, so as to cover the surface of the fabric; then coating the surface with a solution of linseed-oil, caoutchouc and paraffine, then applying a coat of a solution composed of liquid glass, calcium-chloride, and sodium-chloride.

In carrying my improved process into practice, the fabric which forms the foundation of my improved roof-covering is preferably made of stout burlap, which is first sized with a solution of dextrine in water, and then coated at both sides with a mixture composed of twelve gallons of boiled linseed oil, forty pounds of infusorial earth, and forty pounds of whiting, which mixture fills up the meshes of the fabric. On this coating or ground is applied a water-proof coating composed of twelve gallons of raw linseed-oil, eight pounds of caoutchouc, two pounds of paraffine and two pounds of yellow wax, which are boiled until an easy flowing mixture is obtained. The fire-proof solution is next applied, which is composed of one gallon of liquid glass, three pounds of calcium chloride, and one pound of sodium-chloride. By treating the foundation fabric in the manner described, a very durable water and fire-proof roof-covering is obtained at a reasonable expense, and one which is far superior to the ordinary roof-coverings which are now used.

Having thus described my invention, I claim as new and desire to secure by Letters Patent—

The process herein described of preparing water and fire-proof fabrics, which consists of the following steps:—first, sizing the fabric by a dextrine solution, secondly, coating the fabric with a mixture of boiled linseed-oil, infusorial earth and whiting, thirdly, applying a coating of a solution of raw linseed-oil, caoutchouc and a suitable wax or paraffine, and fourthly, coating the surface again with a solution of liquid glass, calcium-chloride, and sodium-chloride, substantially as set forth.

In testimony that I claim the foregoing as my invention I have signed my name in presence of two subscribing witnesses.

HENRY A. CLAASEN.

Witnesses:
PAUL GOEPEL,
I. ESCHLIMANN.